United States Patent [19]

D'Angelo et al.

[11] Patent Number: 5,574,911

[45] Date of Patent: Nov. 12, 1996

[54] MULTIMEDIA GROUP RESOURCE ALLOCATION USING AN INTERNAL GRAPH

[75] Inventors: Stephen D'Angelo, Sunnyvale; Steven H. Goldberg, Burlingame; Robert J. Relyea, Mountain View, all of Calif.; Lars C. Wolf, Heidelberg, Germany

[73] Assignee: International Business Machines Corporation, Armonk, N.Y.

[21] Appl. No.: 566,596

[22] Filed: Dec. 4, 1995

Related U.S. Application Data

[63] Continuation of Ser. No. 101,314, Aug. 3, 1993, abandoned.

[51] Int. Cl.$^6$ .................................................. G06F 17/30
[52] U.S. Cl. .................................. 395/601; 364/DIG. 1; 364/282.1
[58] Field of Search .............................................. 395/600

[56] References Cited

U.S. PATENT DOCUMENTS

| | | | |
|---|---|---|---|
| 4,613,946 | 9/1986 | Forman | 364/518 |
| 4,639,881 | 1/1987 | Zingher | 364/521 |
| 4,710,763 | 12/1987 | Franke et al. | 340/723 |
| 4,821,211 | 4/1989 | Torres | 364/521 |
| 4,893,256 | 1/1990 | Rutherfoord et al. | 364/518 |
| 4,937,743 | 7/1990 | Rassman et al. | 364/401 |
| 4,956,773 | 9/1990 | Saito et al. | 364/200 |
| 5,014,267 | 5/1991 | Thompkins et al. | 370/62 |
| 5,025,395 | 7/1991 | Nose et al. | 364/518 |
| 5,058,185 | 10/1991 | Morris et al. | 382/41 |
| 5,065,345 | 11/1991 | Knowles et al. | 395/154 |
| 5,148,154 | 9/1992 | MacKay et al. | 340/712 |
| 5,195,086 | 3/1993 | Baumgartner et al. | 370/62 |
| 5,208,745 | 5/1993 | Quentin et al. | 364/188 |
| 5,214,778 | 5/1993 | Glider et al. | 395/575 |
| 5,268,846 | 12/1993 | Bonsall et al. | 364/514 |
| 5,289,461 | 2/1994 | de Nijs | 370/58.1 |
| 5,317,732 | 5/1994 | Gerlach, Jr. et al. | 395/600 |
| 5,339,413 | 8/1994 | Koval et al. | 395/650 |
| 5,369,570 | 11/1994 | Parad | 364/401 |

Primary Examiner—Wayne Amsbury
Attorney, Agent, or Firm—Randy W. Lacasse; David J. Kappos

[57] ABSTRACT

An intelligent system for the efficient selection and allocation of the various types of resources available in a multimedia environment. The system interrelates a combination of user input parameters with the resident hardware and software parameters of the requesting multimedia resources by grouping into common computing needs. In addition to traditionally known hardware/software parameters the system recognizes specific limitations of resources which would effect a proper multimedia presentation to the end user. The system uses an internal graph structure to interrelate the various resources as they are allocated to proved for an intelligent data flow.

16 Claims, 4 Drawing Sheets

MULTIMEDIA GROUP RESOURCE ALLOCATION USING AN INTERNAL GRAPH

This is a continuation of application Ser. No. 08/101,314, filed Aug. 3, 1993, now abandoned.

BACKGROUND OF THE INVENTION

1. Field of the Invention

The present invention relates to an apparatus and method for the allocation of multimedia system resources. More, particularly, the present invention relates to an intelligent mechanism for group allocation of multimedia system resources based on device access requests. The invention incorporates the particular limitations of the end user as well as the constraints and priorities of the requesting multimedia devices.

2. Description of the Prior Art

Multimedia can be represented by a variety of devices which produce or use video, audio/voice, graphical, textual/ alphanumeric data, sensorial input or many other types of input/output. Because of the various hardware and software requirements necessary to implement each type of multimedia resource, the simultaneous or concurrent use of multiple types of devices can create serious problems with compatibility in timing, memory allocation, CPU allocation, bandwidth, etc. The proper operation of multimedia devices requires precise timing in delivery of data. An example of the narrow range for compliance for multimedia systems would be a video conferencing environment where it would be intolerable to allow the audio to precede or follow the motion of the speaker's lips as presented in the accompanying video. A half second delay of the audio would be immediately perceived by the user and would be unacceptable for high quality communications.

As can be readily seen from the above example, a definite need exists for the proper management of a multiplicity of multimedia requesting devices to match the needs of the user with the computing resources available. To insure a high quality of playback, the system needs to be able to promise the multimedia requesting devices enough computing resources to complete each of their respective tasks.

The systems currently available in the prior art do not make the required promises to the various resources and therefore the quality of presentation has suffered. Audio clips often skip like a scratched record, and video clips are grainy or skip frames. In addition, because of the inability of prior art systems to properly integrate multimedia devices, the ability of the end user to interact with the system has been greatly limited.

Some prior art systems have attempted to make piecemeal resource allocations. They allow each device to request resources, but since each request is separate, resources allocation occurs with only mixed benefits to the end user. Other prior art systems have made specially coded objects which are tightly coupled in order to make better commitments to resources. This attempt at resource allocation severely limits future development and expandability.

The apparent standard prior art answer to resource allocation is to use existing operating system mechanisms to solve the problem. Most operating systems, for instance, will allow system resources (i.e. memory) to be allocated to a single device/user on a first come basis. This typical prior art mechanism has been common for over 20 years. This method, referred to as a default type allocation, cannot efficiently and properly interrelate a multiplicity of simultaneous or copending multimedia devices.

One step better than the default mechanism has been implementing a special purpose dedicated CPU scheduler or a special network bandwidth allocator to manage resources. This particular solution allows limited intelligence to be integrated into resource allocation, but fails to account for user and device specific constraints.

The following patents are examples of prior art system resource allocation methods. While the references show resource allocation methods, they fail to account for the hardware, software and user constraints as required in a multimedia application versus the discrete data requirements in a non-multimedia application.

U.S Pat. No. 5,148,154 to McKay, et al. admits to the concept of resource management but focuses on the interface a user would interact with to schedule the use of resources in a special three-dimensional manner. The objects in McKay's patent refer to data objects and their place in the display and time dimensions. This is very different from the instant invention which defines an internal automated manner by which a collection of objects could request resources and have them granted.

U.S. Pat. No. 4,937,743 to Rassman, et al. covers the scheduling of resources over time. These resources are allocated to one owner at a time, and provisions are made for automatic rescheduling if conflicts occur. This kind of resource management differs from the one presented herein, and does not address the issue of time, but rather addresses partial ownership and division of resources at any given point in time. The patent implies (through its use of database) that access and decision making is distributed. That is, that each scheduling application makes the decisions necessary and the only central information is the database itself.

U.S. Pat. No. 5,208,745 to Quentin, et al. concerns the use of an interface, scripting language and expert system to solve end-user problems. No mention is made of resource allocation and\or management thereof.

U.S. Pat. No. 5,025,395 to Nose, et al. addresses the idea of objects and the need for objects to have resources associated with them. Its focus is completely on the presentation of these objects in a user interface and the method by which an end-user associates resources with an object. The applications described in the patent allow the user to select a group of objects, but these applications rely on the default or existing system mechanisms for the allocation of these resources, and they do not specify any collaboration or grouping of the objects internal to the system.

OBJECTS OF THE INVENTION

As illustrated above, the prior art has failed to fully integrate a multiplicity of multimedia requests. Therefore, it is an object of this invention to accurately, efficiently and in a timely manner, allocate multimedia computing resources to a plurality of multimedia devices or groups of devices which are requesting access to the system resonrces.

Another object of the invention is to provide for a centralized entity and a heuristic procedure by which computer resources can be requested and allocated.

Another object of the invention is to allow knowledge of particular multimedia device limitations as well as user defined parameters to be integral with the computer resource selection process.

It is a further object of the invention to provide for a graph type data flow structure to properly allocate system resources.

Other objects and advantages of the present invention will become apparent from the detailed description when viewed in conjunction with the accompanying drawings, which set forth certain embodiments of the invention.

SUMMARY OF THE INVENTION

The present invention specifies a technique for allocating system computing resources to groups of requesting multimedia objects or processes. By collecting all knowledge about the constraints of a particular data processing element, of a group of elements or those as imposed by the user, effective allocation of computing resources can take place.

A centralized graph data flow structure represents the collected constraint information and is used to properly construct a data flow path which may then be traversed to sequence each of the requesting elements. Having an entity with centralized knowledge frees objects from the need to know about each other, or to be specifically coded to each other. Once the specific graph structures are known they can be collapsed into simple forms for storage and manipulation.

DESCRIPTION OF THE PREFERRED EMBODIMENTS

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

OVERVIEW

Figure 1:
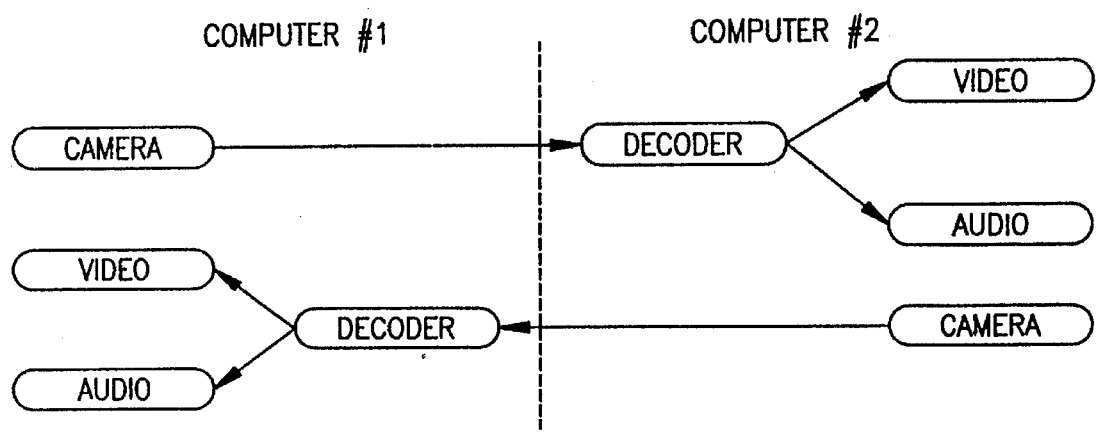
FIG. 1 illustrates a teleconferencing setup showing grouping.

In order to get optimal multimedia computing resource allocation the processing element (object) requests are to be grouped by type. A good example of a case where grouping is useful is a teleconference as shown in FIG. 1. This figure shows two computers on a network sending video and audio back and forth. The two graphs are obviously disconnected, but should be considered as grouped because of the need for allocation of common system resources for each graph. The allocation of computing resources to groups of multimedia processes and objects often depends on system and user constraints and/or limitations. If these constraints are ignored, poor resource allocation will ultimately occur. The system of the instant invention collects the particular constraint information germane to each device, groups of devices and/or applications together to form a centralized management entity, which for this application will be referred to as a "Resource Manager".

COLLECTION OF KNOWLEDGE

The procedure for collection of constraints starts when the user passively places constraints on the resource allocation by selection of particular devices or programs. The end user is meant to be as unaware as possible about resource needs. The user makes decisions about resource constraints by selecting a given application to run. For instance, if the user chooses to play a movie from a server, one set of constraints is implied. If the user had chosen to video-conference with someone other constraints would have been implied. In some cases, the user has other controls such as a video control panel where the user can request what quality of video to use (for example, number of frames per second and frame size).

The selected application is the important place where decisions are made. Common application level decisions in the multimedia environment have traditionally been in the area of limitations of network bandwidth, quality-of-delivery, and end-to-end delay. Network bandwidth limitations stem from the size of the data. For video, this information can be decided upon by the application or by the user. End-to-end delay, however, is often important to the application. For video conferencing, it is important that a delay of less that ½ a second be in place in order to maintain the feeling of interaction with the person on the other end of the connection. This delay is so important that it is okay to use a low quality-of-delivery setting in which video frames could be discarded. Note that playing a movie from a server does not imply any short delays. Instead, it implies that higher quality delivery is more important. The application may make additional specific requests to constrain resource use other than the above examples and therefore should not be limited to the above examples.

The actual multimedia objects/processes are then responsible for using the application, its constraints on performance and user given constraints to calculate details about actual resource usage. For playing a movie, a lot of memory might be required to do buffering and remove jitter. For doing video conferencing, only small buffers would be required, but getting CPU time may be very important.

Applications are expected to know about priorities and be able to place them on requests of all types. Any request to allocate resources can request priorities be given to certain constraints. A common example to this is that, besides specifying the end-to-end delay bounds, the application can request that the delay be considered the most important factor in resource allocation. Hence, priorities can be placed on resource types by the application. In addition, control panel applications may be written which expose to the user details of various objects. Users can to control network priorities or assign relative priorities to applications. With such a control panel the user may set an alarm buzzer to have a higher priority than a mood music player, and the system would account for this.

Requests for ways to optimize resource use can be included. Each object reports the bounds on resource needs that are acceptable for its proper execution. Each object then describes any special parameters (control values) which can be modified to improve or degrade resource needs or data quality. This description also informs the Resource Manager as to what resources are affected by each parameter.

Priorities applying to Control Values are only meaningful to the processing objects, and are not controllable unless that object wishes to expose them. High priority processes, such as the above example "alarm buzzer", can reclaim resources from other multimedia processes.

GRAPH MANAGER

The minimum solution of solving the problems with delays and other multimedia elemental constraints such in a general case system is to provide a central entity, which at minimum has a list of all the objects to be involved in the allocation. This list contains the Group of objects which are under consideration. The central entity can then check to see if each processing element has been attended to, and wait exactly the amount of time it takes to attend to each element.

The best solution to solving problems associated with delays is to introduce a full-fledged central entity called a "Graph Manager". This Graph Manager not only knows the list of objects being Grouped, but also the connectivity between the objects. This allows for ordered sequencing and automatic detection of common groupings. The creation and destruction of each object or process in the data stream is reported to the Graph Manager. This can be done by the object itself, or by an application acting as a client of that object. The preferred embodiment performs this by automatically grouping all objects that are interconnected into a Graph. This frees the application from the need to explicitly group objects.

By placing knowledge of the data flows in a graph, a Graph Manager performs traversals of the graph, and knows when each node and\or edge has been accounted for in a given operation. Without this graph structure knowledge, it would not be easy to know when all the objects had been operated on. The Graph Manager is informed to traverse the graph and perform an operation on each node and/or edge of a graph. The most common kind of traversal with multimedia data streams is from the source of the data to the consumer of the data. This kind of traversal is particularly useful in the reservation of computing resources.

To allocate resources without graph knowledge, the objects would have to talk among themselves and come to a consensus within some external resource allocator. There would be no easy way to determine when all the objects had reported in, so if for any reason (say one of the objects was across a network link) an object reported in late, the system would have to wait an indefinite period of time for completion. In addition, by giving the knowledge of connectivity to another entity, objects are freed from the need to know how they are connected. This leads to other benefits when implementing the solution (such as simplified interfaces).

Alternatively, a Graph Manager is used simply to record which objects have reported back. This reporting is performed by the object itself or by the application acting as client to the object. The application is then able to query the Graph Manager to discover which objects have not yet reported in.

Figure 2:
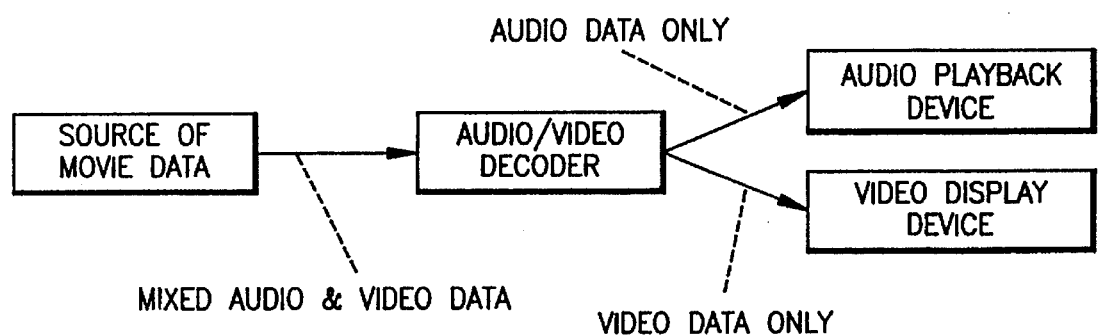
FIG. 2 illustrates a multimedia movie playback scenario.
Figure 3:
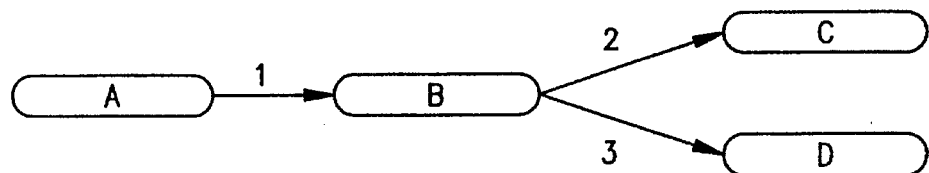
FIG. 3 illustrates a graph representation of FIG. 2.
Figure 7:
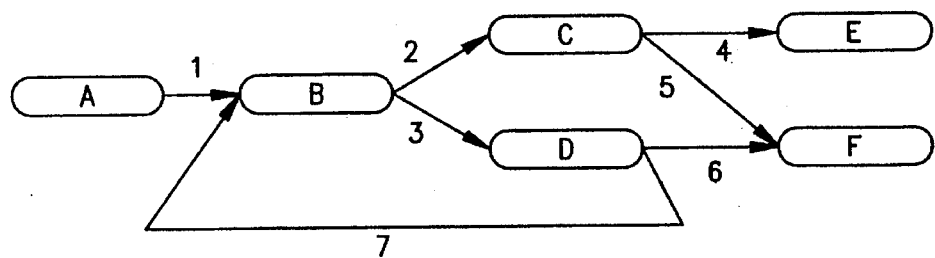
FIG. 7 illustrates a graph structure using feedback.

FIG. 2 illustrates a typical movie playback, including both audio and video. The terminology of graph theory will be explained using the information of the above figure and will be illustrated in FIG. 3. FIG. 3 shows a simple graph which consists of "nodes" and "edges". For convenience, a node is to be a point of processing, such as the audio/video decoder and an edge is to be a type of connectivity, such as the mixed audio and video data path. It is possible to do an equivalent drawing with the edges being used for processing and the nodes for connectivity (they may thought of as hubs). This kind of reversal of terms is purely semantic and does not affect the solution. FIG. 7 illustrates a graph structure as described above with the addition of feedback loops.

Graph theory also allows for two kinds of edges: directed and undirected. Undirected Edges are ones in which only connectivity is important, not direction. Directed Edges imply only a single direction of flow.

The collection of nodes and edges comprising a graph may be represented in storage in many ways, including arrays and linked structures. Typically graphs are used because the data flow path must be traversed (often in a particular order) to make sure all nodes are visited. When only one kind of traversal is performed, the graph can be "collapsed" and represented in a simple data structure. For instance, when it is desirable to traverse the graph from the source of the data flow to the end of the data flow (or visa-versa) the graph can be "collapsed" into a single-dimensional array. This compression is possible since a traversal can be represented as a series of nodes to be visited.

Figure 4:
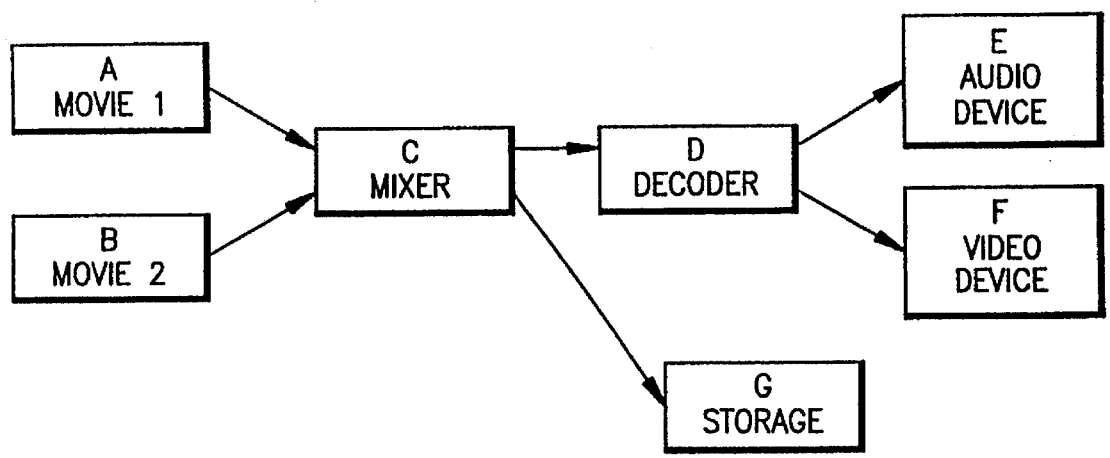
FIG. 4 illustrates a graph of a movie mixer multimedia system.
Figure 5:
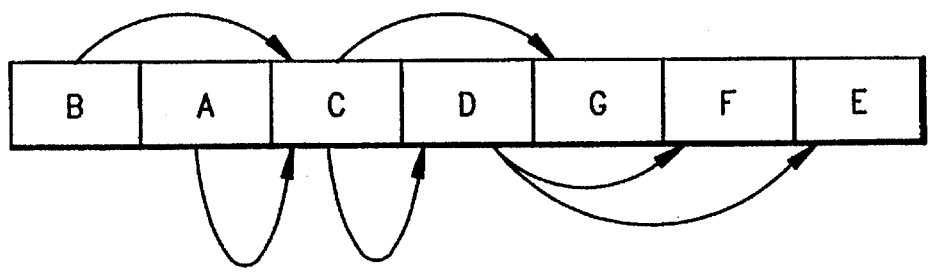
FIG. 5 illustrates a linear collapsed version of the graph structure as shown in FIG. 4.

FIG. 4 shows a common graph for a movie mixer. Two movies are mixed together, stored, and decoded for display on the editing workstation. The graph in FIG. 4 is "collapsed" into the array shown in FIG. 5 because visiting the nodes in the given order guarantees that no node is visited before all the nodes to its left (closer to the source of the data) have been visited. Other array orderings are possible. The arrows are shown on the "array" representation to show that no information about connections between objects is lost. An "array" is simply a matrix of one or more dimensions, and "linked structure" is a set of structures in memory or in a database that have pointers or indexes to one another.

The use of the Graph Manager's information for other traversal problems is also valuable. For instance, it may be useful to be able to query an entire group of objects for status.

A system can make exclusive use of Groups without graph knowledge (that means no edges, just nodes). A system implemented this way gets the benefits of allowing traversals of all the objects and almost all the benefits of a full graph implementation. Groups are extremely important and require a centralized manager.

The following is an example using the movie graph found in FIGS. 3 & 4.

Step 1: an application creates Device 'A' for processing data. Device 'A' reports its existence to the Graph Manager. In the preferred embodiment, this is done with "Open Device Notify".

Steps 2–4: Repeat step 1 to create Devices 'B', 'C', and 'D'. Order of Device creation is not important.

Step 5: The application creates Connection '1' between Devices 'A' and 'B'. Connection '1' reports its existence (and details of how it is connected) to the Graph Manager. In the preferred embodiment, this is done with "Open Connection Notify".

Steps 6–7: Repeat step 5 to create Connections '2' and '3'. Order of Connection creation is not important.

Step 8: At this point, the Graph Manager knows all about the Graph. The application can now do any operations on the graph that it considers valuable. In the present, the primary operation is resource allocation. This is done with "Prepare Device" function.

When done with the objects, the steps should be reversed.

Step 9: The application disconnects the various objects. In the present system this is done by destroying the Connection objects which results in "Close Connection Notify" being called on the Graph Manager.

Step 10: The application destroys the various Device objects. In the present system this results in "Close Device Notify" being called on by the Graph Manager.

RESOURCE MANAGER

Once all the requests are collected, as determined by the Graph Manager, the Resource Manager balances the various constraints on resource allocation and attempts to come up with a successful match. When the number of constraints is known in advance, the algorithm for allocation is determinable in advance. When allowing any number of resources (N) and any number of parameters (M) to affect the solution, a more generic algorithm must be used. The instant invention proposes an iterative, heuristic approach to solving the allocation problem.

As discussed above, if all the possible resources were known in advance, it might be possible to generate a solution space or algorithm for resource allocation in advance. Many systems for handling specific resource constraint sets have been proposed, but general purpose solutions cannot rely on the knowledge of the resource constraints at the time of the writing of the resource management code. In the general case, the Resource Manager needs to handle some unknown number of resources with an unknown number of constraints.

If the constraints can be met with available resources on the system, the Resource Manager can allocate the resources to the various objects at that time.

If one or more of the constraints asks for a computing resource to be allocated at greater than what is currently available for allocation, or if the constraints are to limiting with regards to a resource, one of the parameters that affects that resource is modified and another check is made against the constraints.

It is likely that lowering the use of one kind of resource may increase the use of another kind, and that this process of modifying parameters and rechecking resources is repeated a number times before a solution is found or before it is discovered that not solution can be found. If no solution is found, then the resource allocation request is rejected.

Heuristics can be involved in the selection of which parameters to modify. The Resource Manager may notice that as one resource need is decreased, another increases, and learn some relationship which will speed the arrival at a solution or the answer that no solution is possible.

The algorithm described in this invention approaches resource allocation as a problem in which 'N' resource types are available for objects to share. This set of resources is unlikely to change between attempts to allocate resources. Each resource type has an allocation algorithm associated with it. These algorithms are encapsulated into objects called "Resource Controllers". It is the job of a Resource Controller to dole out the resource it controls. A Resource Controller could control a computing resource (such as CPU time or memory space) or a physical resource (such as a disk drive or audio playback adapter). This object is expected to implement a useful algorithm for reservation and allocation. There are many instances of prior art for such algorithms, and this disclosure does not attempt to cover the subject of such algorithms. The important statement is that there are 'N' resources, each with some object managing its allocation.

For any given attempt at allocation, a group of one or more objects may be interested in resources. Each of these objects may place constraints on their resource needs. These constraints are usually specified in terms of bounds. For example, an object could say that it desires the use of 2.0 megabytes of RAM and that it will accept a minimum of 1.3 megabytes of RAM. Thus, bounds are placed on the allocation of various resources, and it is up to the Resource Manager to take a global view of all the requests and find a solution where all the objects meet their desired value if possible, but at least meet their minimum value.

If we say there are 'A' objects which may want resources, and that each object can request some portion of each of the 'N' resources, then there can be up to 'A * N' requests given to the Resource Manager. This makes a straightforward solution space problem with 'N' variables, and up to 'A' constraints on each variable.

If the number of resources ('N') is known in advance or the number of objects ('A') is small, then it is possible to experimentally and analytically determine an algorithm to solve this problem efficiently. An example would be algorithms for proper scheduling of a set of disk heads. If the numbers for 'A' and 'N' are not bounded or known in advance, other algorithms can be executed which solve the 'A * N' equations with 'N' unknowns problem. There should be prior art on these kinds of problems.

The preferred embodiment of the instant invention uses parameters called Control Values (as previously mentioned). A Control Value is an alterable parameter on a object which will cause it to modify its resource needs. Each object may report as many Control Values as it wants to the Resource Manager. A Control Value is defined by specifying the desired value for the parameter, a worst-case value for the parameter, a priority, and a list of what resource types it will affect. Thus, the Resource Manager is given information as to what "knobs" on the object can be turned, and when one is turned, what resource type's usage will decrease.

Let us say that the Resource Manager receives 'M' Control Value definitions during a given allocation. Control Values can be used by an object to control any facet of its operation. For example, a video capture object may offer a Control Value that varies the level of video compression. The desired value would be set for high-quality capture, while the worst-case value would be set to the minimum the user likes to see. The resource types affected by this parameter might be CPU time, memory space, and bandwidth. Other possible Control Values include video frame rate, quality-of-delivery, or any internal parameter which might affect or be affected by resource use.

With the introduction of Control Values, the Resource Manager now has to solve a problem with 'M' parameters which can nonlinearly affect the up to 'A * N' resource requests. This complication deviates from simple mathematical solutions and necessarily dictates a more complicated algorithm.

The preferred embodiment uses a heuristic algorithm. During each allocation phase, the Resource Manager collects the information (as above) and then attempts to make an allocation using the desired values for each resource (via calls to the Resource Controller). If this succeeds, then the current allocation is completed. If, however, there was not enough of one or more resources, then the Resource Manager looks at the list of failed resource types, and compares it to the list of Control Values. Since each Control Value specifies what resources it can decrease the resource needs of, this eliminates many of the Control Values from determination in solving the problem. Once the smaller list of Control Values that actually affects the failed resource types is determined, the lowest priority Control Value is lowered from its desired value toward its worst value. Then, resource requests are collected again and another attempt at allocation is made. This kind of process is iterated on until either successful solution is reached, or all the Control Values affecting a scarce resource are at their minimum values and still no solution has been found.

Figure 6:
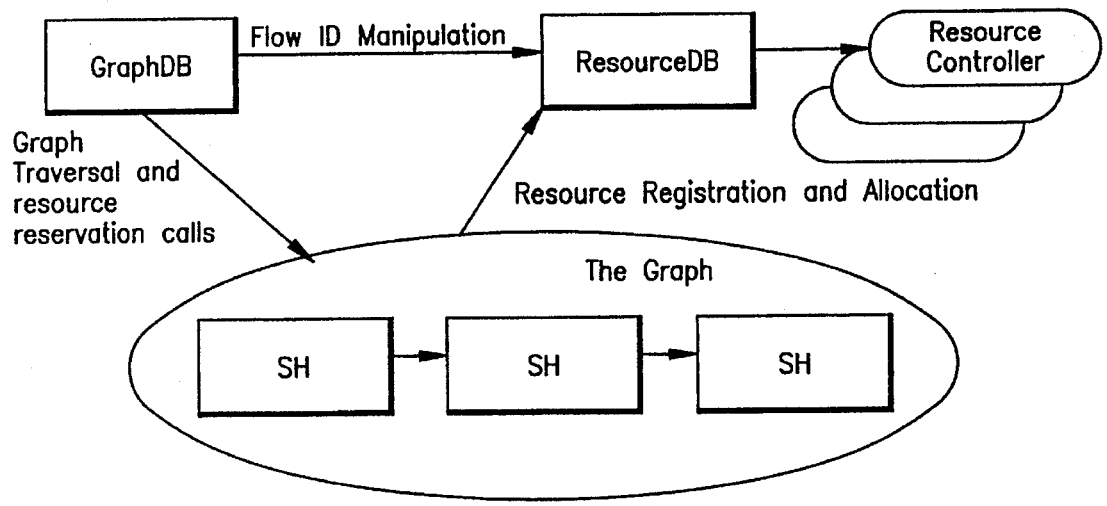
FIG. 6 illustrates the relationships between data processing elements in the present invention.

As per FIG. 6, the key objects in the instant invention are called Devices (they represent logical system devices) and are identified by an ID. Device objects use "Open Device Notify" and "Close Device Notify" functions. Devices are used as Nodes in the discussions of graphs below.

The other important object is called a Connection. These are identified by an ID as well, but the Graph Manager needs to also be told which Device IDs are associated with the start and end of the Connection (since Connections have a direction). On top of that, we have the concept of a "port" or "connection point" on a Device and this information also needs to be conveyed when connection is opened.

Through the use of the Device and Connection open and close notifications it is possible for the Graph Manager to track all the connectivity among graphs without the user or any other application becoming involved. An additional interface has been provided for cases where objects that are not connected explicitly need to be considered grouped for an operation. The "Open Group Notify" function is used to create a group. When creating a group, the application program which is creating and connecting Devices specifies a list of Devices that it wants to have grouped. As above, Devices are identified with IDs. This concept is powerful and useful in cases where two unconnected graphs need to be considered for a single resource reservation or other operation.

As shown in FIG. 6, the various processing elements in the system interact in order to complete the resource allocation phase.

Figure 8:
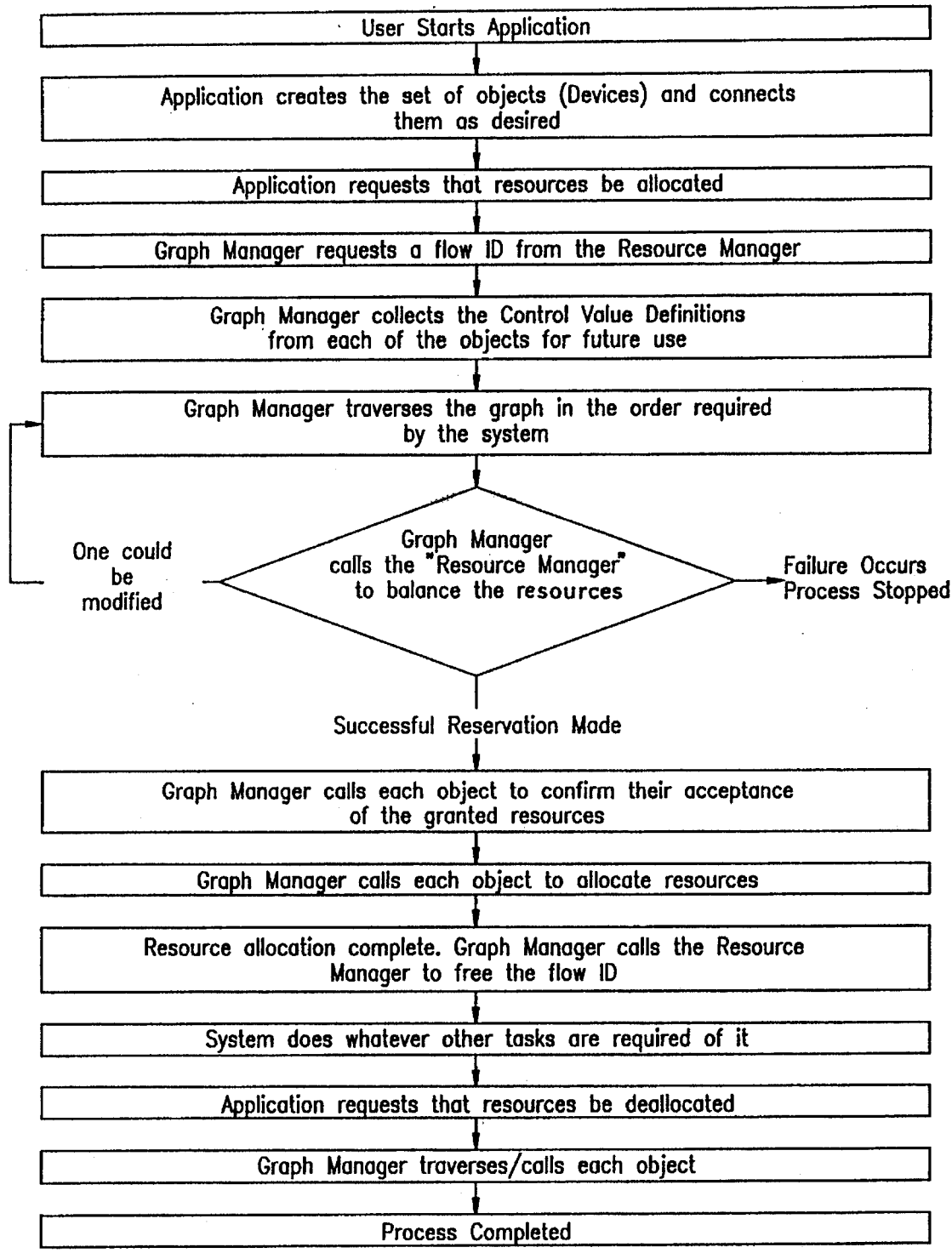
FIG. 8 illustrates a flow diagram of the method of the present invention.

FIG. 8 illustrates a typical set of steps might go as follows:

1. User starts application

2. Application creates the set of objects (Devices) and connects them as desired. During this process, the Graph Manager collects connectivity information.

3. Application requests that resources be allocated. This results in a call to the Graph Manager to do reservation, then allocation of resources.

4. The Graph Manager requests a FlowID from the Resource Manager. This identifier is used in all reservations and allocations from objects in this graph or group.

5. The Graph Manager collects the Control Value definitions from each of the objects for future use.

6. The Graph Manager traverses the graph in the order required by system. This is usually from start of data stream to end.
   a. The first object gets called with a notice that it should request any resources it needs to request of the Resource Manager.
   b. The object calls the register functions on the Resource Manager to request resources. The Resource Manager uses Resource Controllers to complete this task.
   c. Steps 'a' and 'b' are repeated for each other Device object in the graph or group.

7. The Graph Manager calls the "Resource Manager" to balance the resources. If failure occurs, the "Resource Manager" returns the list of resource types that failed. The "Graph Manager" then modifies the appropriate Control Value(s). If no Control Values are appropriate to the resource type, then the resource allocation returns failure. If at least one could be modified, then return to step 6 and try again. Reservation of resources actually marks them as being "in use" but does not allocate them.

8. Once a successful reservation has been made, the Graph Manager calls each object (in a traversal like that of step 6) to let them confirm their acceptance of the granted resources. If any object disagrees with what it is granted, then resource allocation fails.

9. The Graph Manager calls each object to allocate resources (in a traversal like that of step 6). Each object uses the a Get Resources function of the Resource Manager to actually allocate the resources and return information about the resources to the object. The Resource Manager uses the Resource Controllers to complete this task.

10. Resource allocation is now complete, so the Graph Manager calls the Resource Manager to free the FlowID.

11. The system does whatever other tasks are required of it. For example, it could display a movie in a window.

12. The application requests that resources be deallocated. This results in a call the Graph Manager to do the deallocation.

13. The Graph Manager traverses/calls each object (in a traversal like that of step 6). Each object uses a Free Resources function of the "Resource Manager" to deallocate its resources. The "Resource Manager" uses the Resource Controllers to complete the task.

CONCLUSION

A system and method has been shown in the above embodiments for the effective grouping and allocation of computing resources to a plurality of requesting multimedia objects or elements. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. In a computer-based multimedia system, a computing resource allocation system having dynamic allocation of requests by a plurality of objects comprising:

means for creating said plurality of objects and connection thereof;.

means for grouping said requests;

means for collecting hardware, software or flow limitations and constraints associated with each of said plurality of objects and associated connections;

means for determining the allocation of said computing resources based on said grouping and said collected limitations and constraints:

internal graph means to coordinate said allocation of said requests for said computing resources with each of said computing resources responding to said internal graph means, and means responsive to said internal graph means to allocate said computing resources to said requesting objects.

2. A computing resource allocation system as in claim 1, wherein if sufficient resources are available to satisfy the requests of a given group, the means to allocate allocates the requested resources to each requester.

3. A computing resource allocation system as in claim 1, wherein if sufficient resources to satisfy said requests of a given group are not available, the means for determining determines a scenario which enables the resource allocation system to comply with all of said requests while remaining within the bounds of each requestors hardware/software constraints.

4. A computing resource allocation system as per claim 1, wherein said means for determining is implemented with a heuristic algorithm.

5. A computing resource allocation system as per claim 1, wherein said internal graph means comprises a plurality of nodes and edges.

6. A computing resource allocation system as per claim 1, wherein said internal graph means is collapsed and stored as arrays or linked structures.

7. A method of allocation of multimedia computing resources to a plurality of requests from a plurality of processing elements comprising:

collecting hardware, software or flow constraints associated with said requesting elements;

collecting variable parameters associated with each of said requesting elements;

collecting user specific constraints associated with selected applications to be run during said allocation of said multimedia computing resources;

grouping all of said requests by type;

determining the allocation of said multimedia computing resources based on said hardware and software constraints, said variable parameters, said user specific constraints and said request types;

creating an internal graph structure representing said allocation;

traversing said internal graph to coordinate the proper sequence of said requesting elements, and contacting each of said requesting elements to confirm acceptance of said sequence and, upon acceptance, allocating said computing resources to said requesting objects.

8. The method of resource allocation as per claim 7, wherein said determining step is implemented with a heuristic algorithm.

9. The method of resource allocation as per claim 7, wherein said variable parameters represent a range of acceptable operation.

10. The method of resource allocation as per claim 9, wherein said method provides for flexible allocation and deallocation of said resources based on said range of acceptable operation.

11. The method of resource allocation as per claim 10, wherein said constraints of each requesting device are dynamically modified based on said flexible allocation and deallocation.

12. The method of resource allocation as per claim 7, wherein said internal graph structure comprises a plurality of nodes and edges.

13. The method of resource allocation as per claim 7, wherein said internal graph structure is collapsed and the collapsed graph is stored as arrays or linked structures.

14. In a computer-based multimedia system, a computing resources allocation method having dynamic allocation of requests by a plurality of objects comprising the following steps:

selection of a computer application;

said application creating a set of objects and connecting them;

said application requesting allocation of said computing resources from a resource manager;

said graph manager collects flow identification from said resource manager;

said graph manager collects control values from said objects;

said graph manager interacts with said resource manager to optimize balancing of said computing resources based on said flow identification and control values;

said graph manager requests acceptance of said optimized balancing from said objects, and upon acceptance, said graph manager calls each object to allocate resources.

15. In a computer-based multimedia system, a computing resources allocation method having dynamic allocation of requests by a plurality of objects, as per claim 14, wherein said optimize balancing step is implemented with an artificial intelligence method.

16. In a computer-based multimedia system, a computing resources allocation method having dynamic allocation of requests by a plurality of objects, as per claim 14, wherein said optimize balancing step is implemented with a heuristic algorithm.

* * * * *

UNITED STATES PATENT AND TRADEMARK OFFICE
CERTIFICATE OF CORRECTION

PATENT NO. : 5,574,911

DATED : November 12, 1996

INVENTOR(S) : D'Angelo et al.

It is certified that error appears in the above-indentified patent and that said Letters Patent is hereby corrected as shown below:

ON THE TITLE PAGE:

IN THE ABSTRACT

Line 7, after "parameter" insert --,--.

Line 11, "proved" should read --provided--.

Col. 2, line 36, after "and" delete ".".

Col. 2, line 57, "resonrces" should read --resources--.

Col. 3, line 54, after "allocation" insert --,--.

Col. 4, line 54, after "can" delete "to".

Col. 5, line 66, after "may" insert --be--.

Col. 7, line 32, "to" should read --too--.

Col. 7, line 40, "not" should read --no--.

Col. 9, line 36, after "steps" insert --which--.

Col. 10, line 11, after "the" delete "a".

Col. 10, line 20, after "call" insert "to".

UNITED STATES PATENT AND TRADEMARK OFFICE
CERTIFICATE OF CORRECTION

PATENT NO. : 5,574,911

DATED : November 12, 1996

INVENTOR(S) : D'Angelo et al.

It is certified that error appears in the above-indentified patent and that said Letters Patent is hereby corrected as shown below:

Col. 12, line 22, "said" should be --a--.

Signed and Sealed this

Thirteenth Day of May, 1997

*Attest:*

BRUCE LEHMAN

*Attesting Officer*    Commissioner of Patents and Trademarks